United States Patent
Ross et al.

(10) Patent No.: US 6,447,075 B2
(45) Date of Patent: Sep. 10, 2002

(54) VEHICLE BRAKING SYSTEM USING STORED VEHICLE PARAMETERS FOR ELECTRONIC CONTROL OF BRAKING

(75) Inventors: Colin Ford Ross, Kidderminster; Matthew John Fry, Bristol, both of (GB)

(73) Assignee: Knorr-Bremse Systems for Commercial Vehicles Limited (GB)

( * ) Notice: Subject to any disclaimer, the term of this patent is extended or adjusted under 35 U.S.C. 154(b) by 0 days.

(21) Appl. No.: 09/879,038

(22) Filed: Jun. 13, 2001

(51) Int. Cl.[7] .............................. B60T 8/00; B60T 8/18; B60T 13/66

(52) U.S. Cl. ..................... 303/20; 188/195; 303/22.1; 303/7; 303/198

(58) Field of Search .......................... 303/7–8, 15, 20, 303/22.1, 198, 9.69, 22.4, 22.6, 22.7, 123, 118.1, 122.04, 122; 188/195, 3, 112; 701/70; 702/85, 87, 88

(56) References Cited

U.S. PATENT DOCUMENTS

| | | | | |
|---|---|---|---|---|
| 4,712,839 A | * | 12/1987 | Brearley et al. | ............ 188/195 |
| 4,920,493 A | * | 4/1990 | Brearley et al. | |
| 5,080,445 A | * | 1/1992 | Brearley et al. | ................ 303/7 |
| 5,088,042 A | * | 2/1992 | Brearley et al. | |
| 5,615,931 A | * | 4/1997 | Stumpe et al. | ............. 303/22.1 |
| 5,632,530 A | * | 5/1997 | Brearley | ..................... 303/22.1 |
| 5,662,389 A | * | 9/1997 | Truglie et al. | ................ 303/20 |

FOREIGN PATENT DOCUMENTS

JP          11-521          1/1999

* cited by examiner

Primary Examiner—Douglas C. Butler
(74) Attorney, Agent, or Firm—Barnes & Thornburg

(57) ABSTRACT

A compressed air operable wheeled trailer braking system includes a braking electronic control unit (ECU) having an electronically operable control valve which derives suitably proportioned load and vehicle speed dependent service brake pressure for brake chambers of the trailer wheeled. The braking ECU has a data memory storing specific braking parameters normally installed therein prior to commissioning the trailer. The trailer has a further diagnostic ECU responsive to vehicle operational sensors, the further ECU also having memory capacity. The specific braking parameters are stored via a communication link consequent upon installation thereof to the braking ECU. Upon recognizing installation of a replacement braking control unit, the parameters from the further ECU are installed in the replacement ECU.

10 Claims, 4 Drawing Sheets

VEHICLE BRAKING SYSTEM USING STORED VEHICLE PARAMETERS FOR ELECTRONIC CONTROL OF BRAKING

This invention relates to a vehicle braking system using stored vehicle parameters for electronic control of brake forces and relates more especially but not exclusively to road trailer vehicle compressed air operable brakes which are signalled from a tractor vehicle.

In European and other countries there are a large number of small engineering companies building road trailer vehicles designed for use with various tractors employing compressed air operable brakes. Such trailer builders tend to specialise in specific vehicle types but to meet statutory braking requirements it is a common feature that trailers are provided with means which controls the braking force signalled from a towing tractor, and uses a proportional load sensing valve for adjusting brake pressure or in the case of electronic load sensing has an electronic control unit (ECU). In the case of a system which a mechanical load sensing pressure proportioning valve, if the valve needs to be replaced, a replacement valve can be readily set up using parameters supplied to the user with the trailer, by the builder, to define pressure producing the onset of braking (i.e. inshot), tare weight braking and full load braking.

However in the case of electronic control by an ECU, possibly also including anti-lock control, specific trailer parameters are initially installed into a configuration data memory of the ECU by a trailer builder using specialised equipment. If the ECU is subsequently required to be replaced due to failure or damage there is a problem in that the vehicle operator is normally unlikely to possess or have ready access to such specialised or suitable peripheral electronic equipment to re-enter specific system parameter settings into the memory of a replaced and unparameterised ECU.

The present invention has an object to provide a vehicle braking system wherein the aforesaid problem is removed or substantially reduced.

According to the invention there is provided a vehicle braking system including means operable to provide a signal indicative of vehicle loading, load responsive means responsive thereto and to a braking signal indicative of intended vehicle deceleration for controlling braking force produced by brake actuators of the vehicle said load responsive means comprising a parameterisable electronic braking control unit with a main configuration memory for storing parameters particular to the vehicle for control of vehicle brake force according to vehicle loading characterised in that said system includes a further electronic storage memory wherein said parameters particular to the vehicle are permanently retainable and means to effect entry of said parameters from said further memory to the main configuration memory of an unparameterised electronic braking control unit.

More especially, the invention provides a trailer vehicle braking system including means operable to produce a signal indicative of vehicle loading, load responsive means responsive thereto and to a braking signal indicative of intended vehicle deceleration for controlling braking force produced by brake actuators of the vehicle said load responsive means comprising a main parameterisable electronic braking control unit with a main configuration memory for storing braking parameters particular to the vehicle for control of vehicle brake force according to vehicle loading a further electronic control unit including a configuration memory storing parameters particular to management of the vehicle and also a further electronic storage memory wherein said braking parameters particular to the vehicle are also permanently retainable and means operable to effect entry of said parameters from said further electronic memory to the main configuration memory of another unparameterised electronic braking control unit when substituted for said main unit.

According to another aspect of the invention there is provided a trailer vehicle braking system including means operable to produce a signal indicative of vehicle loading, load responsive means responsive thereto and to a braking signal indicative of intended vehicle deceleration for controlling braking force produced by brake actuators of the vehicle said load responsive means comprising a main parameterisable electronic braking control unit with a main configuration memory for storing braking parameters particular to the vehicle for control of vehicle brake force according to vehicle loading a further electronic vehicle management control unit including a further configuration memory for storing management parameters particular to management of the vehicle and wherein said main control unit includes additional electronic storage memory wherein said parameters particular to management of the vehicle are also retainable and means operable to effect entry of said management parameters from said additional memory to a configuration memory of an unparameterised electronic control unit when substituted for said vehicle management control unit.

In order that the invention may be more clearly understood and readily carried into effect the invention will now be further described by way of examples with reference to the accompanying drawings of which FIG. 1 illustrates a two-line trailer compressed air braking system with electronic load sensing adapted according to one FIG. 2 illustrates, in a schematic manner, the signal flow for the operation of a preferred system.

Figure 1:
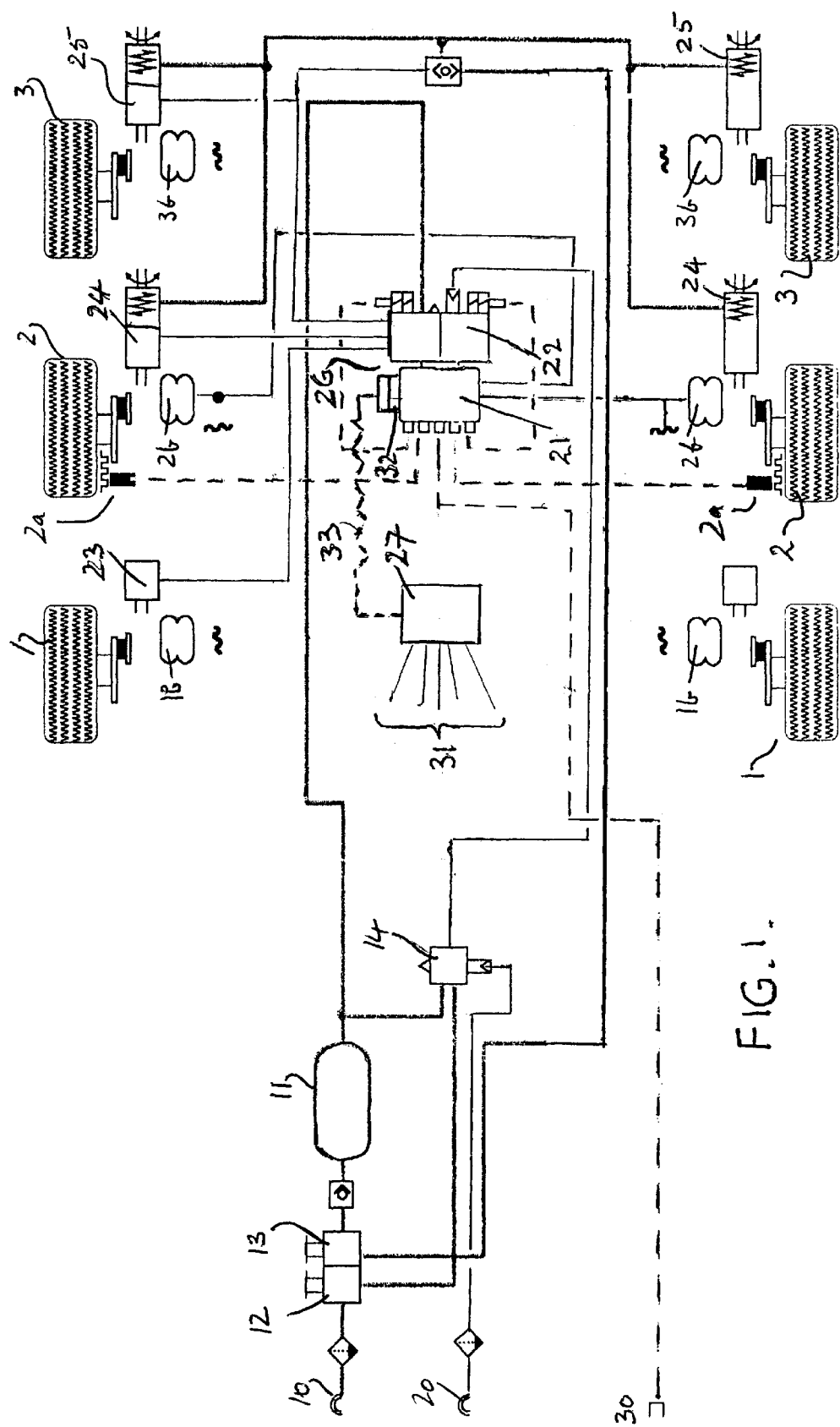

Referring to FIG. 1, a semi-trailer has three braked axles of respective pairs of wheels 1, 2 and 3 with respective compressed air operated brakes and controlled air suspensions represented by references 1b, 2b and 3b the pressures in which depend upon the loading of the trailer. A conventional trailer reservoir supply line coupler 10 is connected in operation via lines (shown heavy) to derive pressure from a tractor to a trailer reservoir 11 via a manoeuvring park valve 12 (park and shunt valve) and a relay emergency valve 14 and also to spring brake parking sections of double diaphragm tandem actuators 24, 25 for the brakes of the respective wheels 2 and 3 of two of the axles. If desired the functions of the valves 12 and 14 can be combined in a single assembly in accordance with a disclosure in copending Gerrnan Patent Application No. 19853718. A conventional trailer control line coupler 20 is connected in operation to provide a control input from the tractor vehicle to the relay emergency valve 14, the delivery from which is an input to a system control valve assembly 22 of an ECU 26 having electronics 21 with an electrical plug coupler 30 to the tractor and deriving suitably proportional service brake pressure from the trailer reservoir 11 to respective service brake chambers 23, 24, 25 of the respective wheels. The ECU 26 receives vehicle wheel speed signals from wheel transducers 2a for wheels 2 and pressure transducer signals representing the load dependent pressure from transducers (not shown) associated with the air suspensions 2b of the axle carrying wheels 2.

The ECU 26 includes a main configuration data memory and electronics 21 for specific braking related vehicle parameters which enable it to control the valve assembly 22 to supply braking pressure to the brake actuators appropriate to the loading and operating condition of the particular trailer. This memory is parameterised by the trailer builder using specialised equipment, to enable the function of the ECU to be matched to the particular vehicle, in a manner which is analogous to setting up of a conventionally mechanically operable variable load valve in a purely pneumatic system. Thus ECU 26 will determine the delivered basic pressure or inshot pressure established at onset of braking and thereafter provide appropriate graduation of brake pressures between tare weight and full load braking pressure curves for the particular trailer. It will further be understood that it is desirable for a vehicle operator to be able to replace a damaged ECU 26 with minimal delay or complication despite the fact that an ECU parameterised with vehicle parameters specific to the vehicle will not in general be readily available even from specialist automotive components or parts distributors.

In the system of FIG. 1 there is included trailer management and information means including a further electronic control unit (ECU) 27 adapted to receive, from sensors (not shown) connected to inputs 31, indications of the locked or interlocked status of trailer body rear door locks, trailer body temperature, trailer reversing obstacle detection, tire pressure monitoring and information for determining imminence of servicing requirements based upon trailer use. The ECU 27 can communicate such information visibly or audibly to the tractor vehicle driver or to one or more remote information control stations via radio or satellite links. For the purpose of its function ECU 27 also includes a main configuration data memory. The ECU 27 also has additional specific memory capacity wherein specific vehicle parameters are stored consequent upon the vehicle builder parameterising the main memory of the braking ECU 26.

The ECU 26 includes multipin socket connections 32 to a readily connected multiplug communication link and coupler 33 via enabling inter alia detection of substitution of an unparameterised ECU, as a replacement for a damaged crucial braking ECU 26. The ECU 27 can thereby initiate a function for newly parameterising the replacement ECU 26 using stored parameters specific to the particular trailer.

Figure 2:
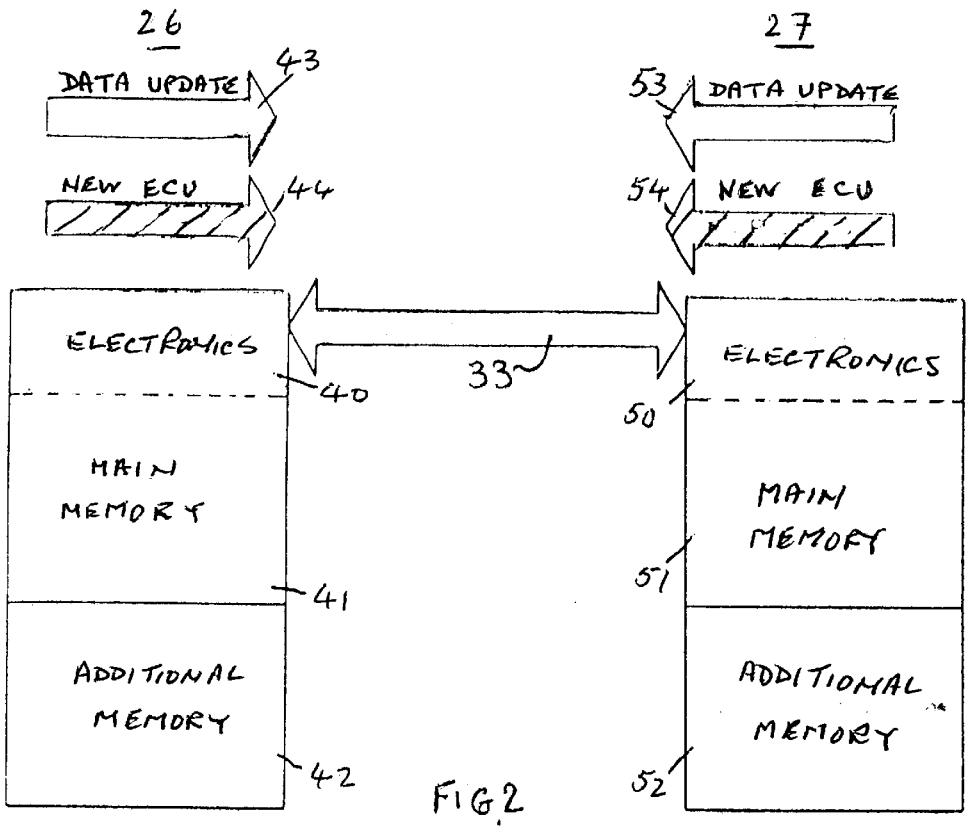

In a preferred embodiment of a trailer braking system according to the invention the ECU's 26 and 27 are provided with respective electronic sub-systems 40, 50 as illustrated diagrammatically in FIG. 2, each of which has a respective main configuration data memory. (41, 51) and a respective additional data memory (42, 52). The data communication link 33 between the ECU's 26 and 27 permits parameterising communication between in each case the additional data memory of the ECU and the main configuration data memory of the other. The data communication link 33 transmits flag signals between ECU 26 and ECU 27 whereby each can indicate to the other, detection of a "new ECU" (44, 54) and or imminent "data update" (43, 53). In FIGS. 2–6 "TRUE" present signals are indicated by hatching. Further, validity presently stored braking or management data is represented respectively by hatching or cross-hatching of memories 41, 42, 51 and 52.

Figure 3:
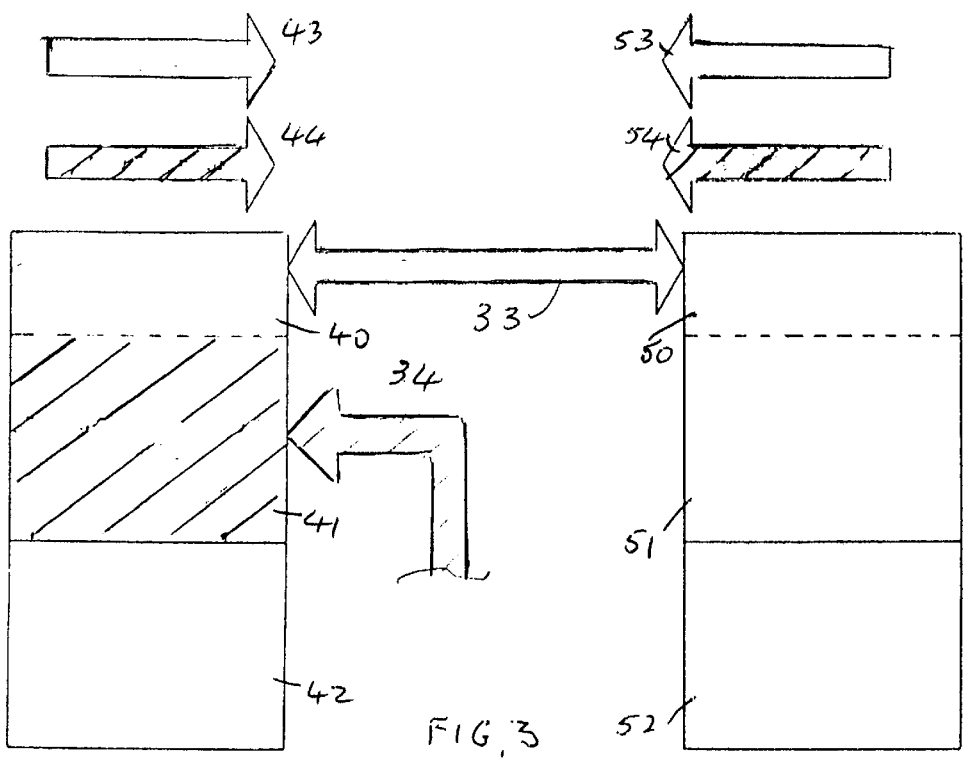
FIG. 3 is a schematic flow for the operation wherein each electronic control unit has a new ECU flag signal for initial parameterising.

When the trailer is manufactured it is prepared for service as represented in FIG. 3 with each ECU initially presenting a "new ECU" flag signal. Using external computing equipment, the trailer manufacturer enters initial parameterising data to system 40 which parameterises the configuration data memory 41, according to specific entered vehicle characteristic data. This data determines specified required computed responses of the trailer brakes to brake pressure signals from a tractor vehicle relative to loads carried by the trailer.

Figure 4:
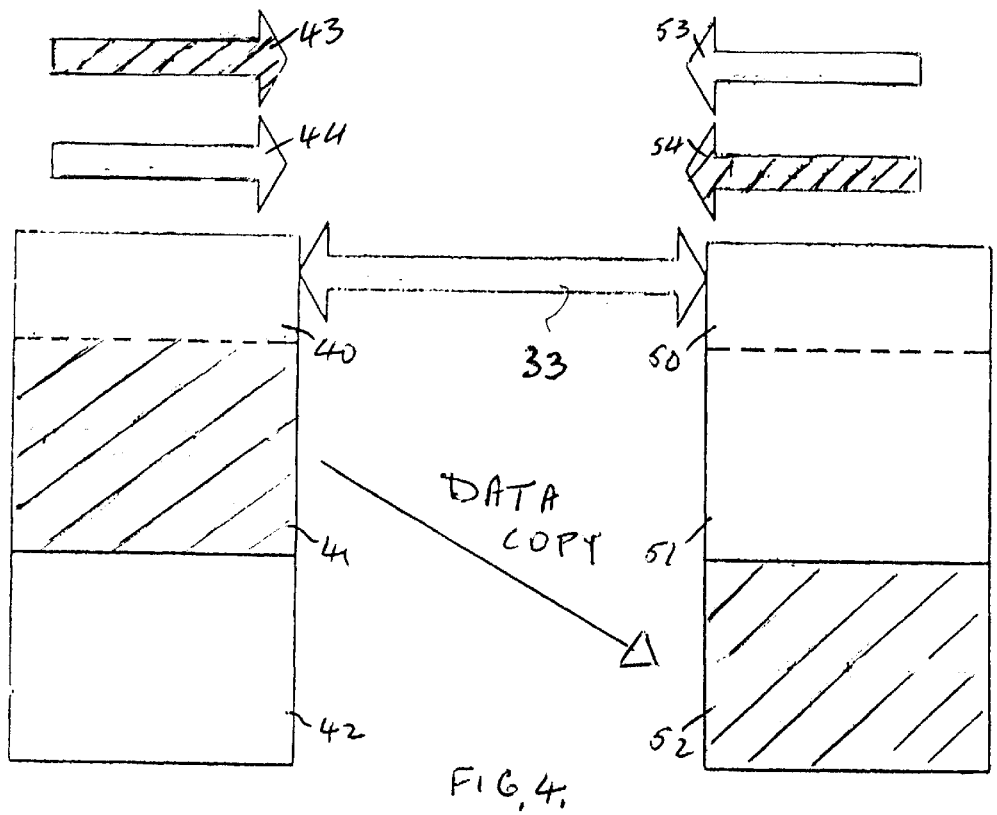
FIG. 4 illustrates, in a schematic manner, the signal flow for the operation of a preferred system and subsequent parameterising cycle to the initial parameterised cycle of FIG. 3.

Following the described initial parameterising as represented at 34 of FIG. 3 of the configuration data memory 41 of ECU 26, as seen represented in FIG. 4 in a subsequent parameterising cycle, a "new ECU" flag signal 43 of system 40 clears and 40 sets a "data update" flag signal 43 which with a "new ECU" flag signal 54 of system 50 permits the new data to be copied from memory 41 into the additional memory 52 of 27.

Figure 5:
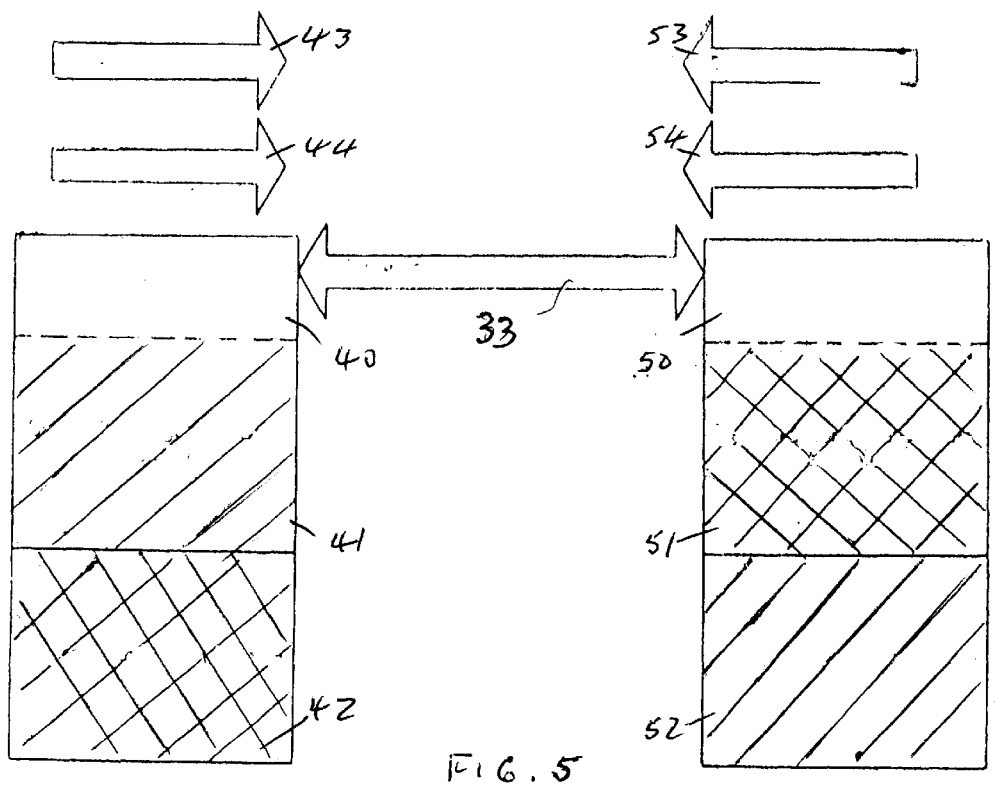
FIG. 5 illustrates, in a schematic manner, the normal operating state of the parameterised system.
Figure 6:
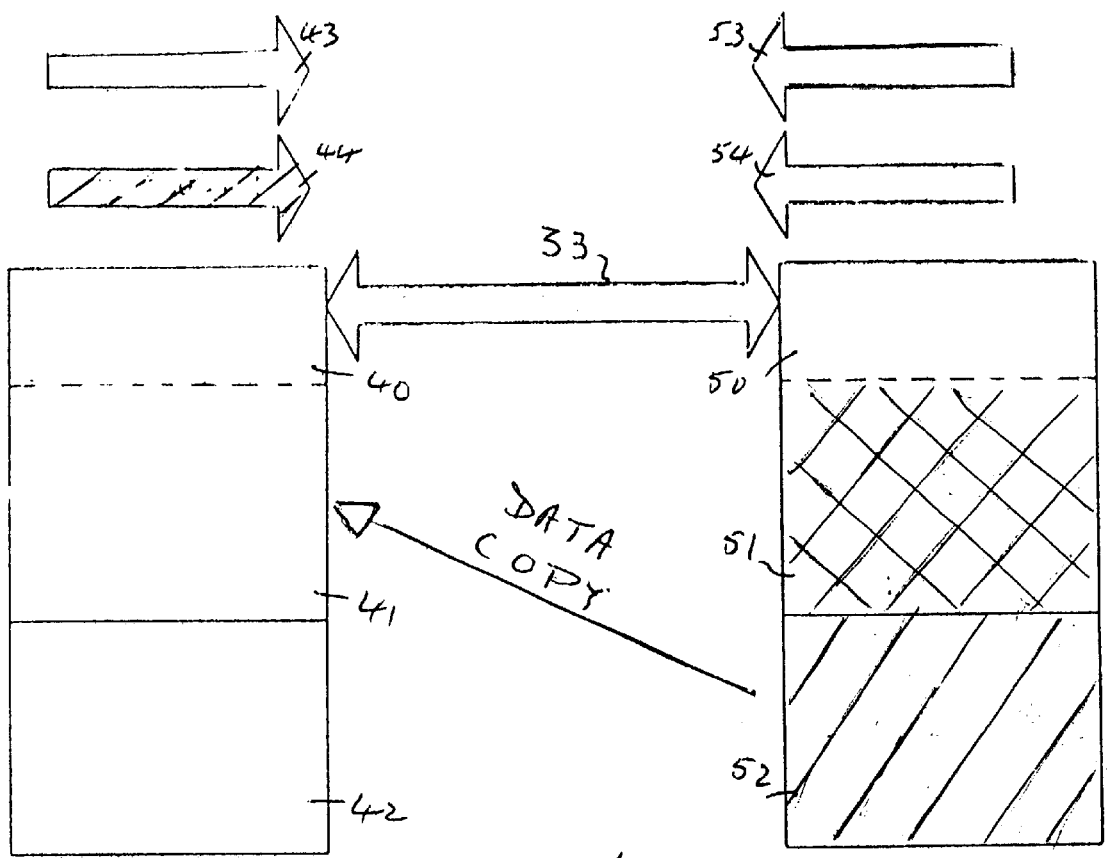
FIG. 6 illustrates, in a schematic manner, the signal flow for the operation of a preferred system for the installation of a new ECU with an initialized ECU.

Similarly, during a further parameterising cycle, the configuration data memory 51 for ECU 27 presenting a "new ECU" signal, is initially programmed with additional vehicle management data by the manufacturer from the external computing equipment. In yet another cycle, with a present "data update" flag signal of system 40, copying of the management data contents of configuration data memory 51 to the memory 42 of ECU 26, takes place. The resulting normal operable state of the parameterised system is then as illustrated in FIG. 5.

For normal operation of the trailer vehicle and its brakes in service the configuration data memories of ECU 26 (braking) and ECU 27 (other parameters namely distance logging and other diagnostic parameters) are used as the basis of operation and management of the trailer vehicle. However in the event of one ECU, especially the crucial braking ECU 26, being damaged and requiring replacement a standard but unparameterised replacement unit may be purchased and fitted by the operator. When the system is re-energised with such replacement correctly installed, the presence of the new ECU is indicated by presence of a "new ECU" flag signal (FIG. 6) to initiate copying of contents of memory 52 into the configuration data memory 41 of ECU 26.

Although not described in detail in the foregoing, it will be appreciated by the skilled person that the communication link 33 between ECU 26 and ECU 27 may preferably comprise a suitable multicore conductor or optical connection which carries digital signal elements making up not only the flagging signals for initiating copying of stored parameters between respective memories as described but also the parameters in digitised form along with check code elements bits. The clock rate for such transfer of information is preferably a submultiple of a much higher operating clock rate governing the incremental brake pressure control and wheel antilock control if provided.

In the described embodiment, in addition to means whereby entry into a replacement ECU 26 of crucial braking parameters from the further memory 52 according to the invention, with sub-system 40 of the braking control ECU 26 also provided with the additional memory capacity 42, it is possible for the vehicle management ECU 27 to be replaced and reparametised with valid management information especially that relating to servicing intervals of the vehicle.

The invention therefore provides the substantial advantage to a trailer operator that a potentially widely available unparameterised stock individual replacement ECU may be immediately parameterised for a particular trailer upon installation thereof, by copying crucial data from within a distinct intact system of the vehicle without any need for external specialised computer equipment. Vehicle downtime and cost is therefore much less than may otherwise be the case.

What is claimed is:

1. A vehicle braking system including means operable to produce a signal indicative of vehicle loading, load responsive means responsive thereto and to a braking signal indicative of intended vehicle deceleration for controlling braking force produced by brake actuators of the vehicle, said load responsive means comprising a parameterisable electronic braking control unit with a main configuration memory for storing braking parameters particular to the vehicle for control of vehicle brake force according to vehicle loading wherein said system includes a further electronic storage memory wherein said braking parameters particular to the vehicle are permanently retainable and means operable to effect entry of said parameters from said further memory to the main configuration memory of an unparameterised electronic braking control unit.

2. A vehicle braking system as claimed in claim 1, wherein said further electronic storage memory is a memory of a further electronic control unit.

3. A vehicle braking system as claimed in claim 2, wherein said further electronic control unit has a paramneterisable main memory storing parameters particular to further functions relating to operation of the vehicle.

4. A vehicle braking system as claimed in claim 3, wherein said electronic braking control unit is provided also with additional electronic storage memory permanently retaining parameters particular to one or more said further functions the system further including means to effect entry of one or more said further parameters from said additional storage memory to a said parameterisable memory of said further electronic control unit.

5. A vehicle braking system as claimed in claim 4 wherein a data communication link between said electronic control units is operable to signify one to each within the system that said entry of parameters is validly possibly and required to parameterise a respective said parameterisable main memory.

6. A vehicle braking system as in claim 1 wherein the braking system is a compressed air system.

7. A trailer vehicle braking system including means operable to produce a signal indicative of vehicle loading, load responsive means responsive thereto and to a braking signal indicative of intended vehicle deceleration for controlling braking force produced by brake actuators of the vehicle, said load responsive means comprising a main parameterisable electronic braking control unit with a main configuration memory for storing braking parameters particular to the vehicle for control of vehicle brake force according to vehicle loading a further electronic control unit including a configuration memory storing parameters particular to management of the vehicle and also a further electronic storage memory wherein said braking parameters particular to the vehicle are also permanently retainable and means operable to effect entry of said parameters from said further electronic memory to the main configuration memory of another unparameterised electronic braking control unit when substituted for said main unit.

8. A trailer vehicle braking system as in claim 7 wherein the braking system is a compressed air system.

9. A trailer vehicle braking system including means operable to produce a signal indicative of vehicle loading, load responsive means responsive thereto and to a braking signal indicative of intended vehicle deceleration for controlling braking force produced by brake actuators of the vehicle, said load responsive means comprising a main parameterisable electronic braking control unit with a main configuration memory for storing braking parameters particular to the vehicle for control of vehicle brake force according to vehicle loading a further electronic vehicle management control unit including a further configuration memory for storing management parameters particular to management of the vehicle and wherein said main control unit includes additional electronic storage memory wherein said parameters particular to management of the vehicle are also retainable and means operable to effect entry of said management parameters from said additional memory to a configuration memory of an unparameterised electronic control unit when substituted for said vehicle management control unit.

10. A trailer vehicle braking system as in claim 9 wherein the braking system is a compressed air system.

\* \* \* \* \*